W. G. CREAMER.
Basket-Rack for Railway-Cars.
No. 9,238. Reissued June 8, 1880.
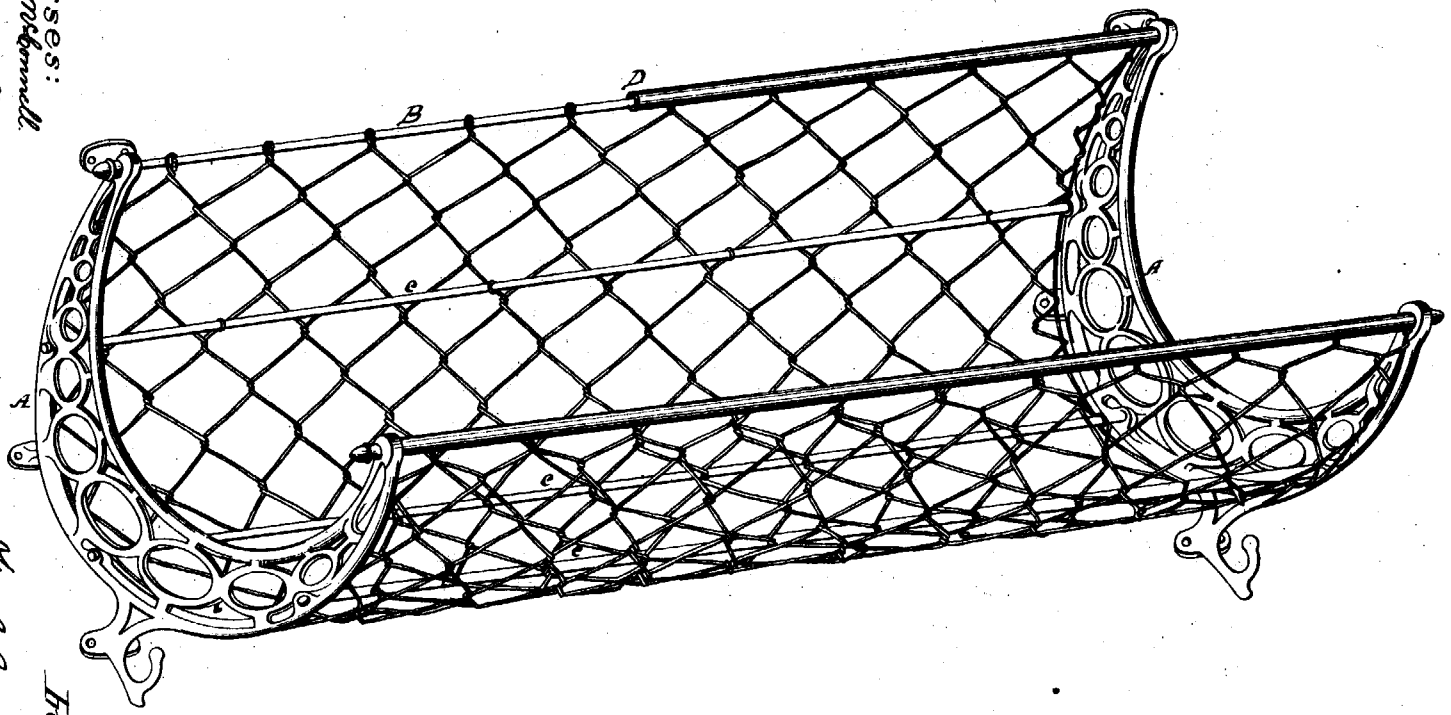
Witnesses:
Geo. L. McDonnell.
Walter C. Munson
Inventor:
Wm. G. Creamer
N. PETERS, PHOTO-LITHOGRAPHER, WASHINGTON, D. C.

UNITED STATES PATENT OFFICE.

WILLIAM G. CREAMER, OF BROOKLYN, NEW YORK.

BASKET-RACK FOR RAILWAY-CARS.

SPECIFICATION forming part of Reissued Letters Patent No. 9,238, dated June 8, 1880.

Original No. 92,174, dated July 6, 1869. Application for reissue filed January 26, 1880.

*To all whom it may concern:*

Be it known that I, WM. G. CREAMER, of the city of Brooklyn, county of Kings, State of New York, have invented a new and Improved Mode of Constructing Basket-Racks for Railroad-Cars; and I do hereby declare that the following is a full, clear, and exact description of the same, reference being had to the accompanying drawing and the letters of reference marked thereon.

The nature of my invention consists in covering or otherwise concealing and protecting the connections of the wire-netting with the two front rods of the rack for the purpose of making them smooth, giving a better finish, and preventing the catching or chafing of shawls, clothing, or bags on the rough edges or projections caused by binding the wire on the rods, as is the usual way of constructing basket-racks.

To enable others skilled in the arts to make and use my invention, I will proceed to describe its construction and operation.

I construct my basket-racks of any desired form, with brackets A A at the ends and wire-netting between them formed around the outside of the brackets, substantially as shown in the accompanying drawing.

The plan I consider the simplest and best is to make the two front rods, B B, to which the wire-netting is attached, slightly longer than the inner rods, *c c c*.

The ends of the outer rods, B B, are threaded and fancy nuts fitted on the ends, the wire-netting composing the body of the rack being then connected to the front rods, B B. I then make two tubes, usually of ornamental brass, with a slot running the entire length, just wide enough to pass the thickness of the wire-netting. These tubes I slip over the front rods, B B. I then form the netting up to fit the brackets A A and put the rack together, as shown in the drawing, and it is then ready to set up in the car.

For purposes of illustration I have shown in the drawing, on a portion of the top rod from the bracket A to the letter D, the usual way of constructing basket-racks for cars.

What I claim as my invention is—

In a basket or baggage rack, substantially as described, the combination of the rods to which the netting is attached with tubular coverings concealing the rods and connections of the netting, so as to prevent injury to the contents of the rack, substantially as set forth.

WM. G. CREAMER.

Witnesses:
W. L. MCKEE,
HENRY L. BREVOOR.